United States Patent [19]

Myers et al.

[11] Patent Number: 4,712,657

[45] Date of Patent: Dec. 15, 1987

[54] METHOD AND MEANS FOR SEALING A CARRYING CASE

[75] Inventors: Jay E. Myers, Laguna Beach, Calif.; M. Todd Myers, New York, N.Y.; Siamak Iravantchi, Lawndale, Calif.

[73] Assignee: Andiamo Inc., Fountain Valley, Calif.

[21] Appl. No.: 10,693

[22] Filed: Feb. 4, 1987

Related U.S. Application Data

[62] Division of Ser. No. 828,769, Feb. 12, 1986.

[51] Int. Cl.$^4$ .................. B65D 53/00; A45G 13/36
[52] U.S. Cl. .................. 190/28; 220/4 B; 220/81 R; 220/378; 220/72; 29/463
[58] Field of Search .................. 29/463; 220/4 B, 80, 220/81 R, 378, 4 E, 72; 190/28

[56] References Cited

U.S. PATENT DOCUMENTS

| | | |
|---|---|---|
| 1,811,718 | 6/1931 | Hofbauer . |
| 2,510,643 | 6/1950 | Long .................. 190/28 |
| 2,554,091 | 5/1951 | Davis .................. 280/57 |
| 2,578,238 | 12/1951 | Goldman .................. 224/42.42 |
| 2,602,675 | 7/1952 | Forman .................. 280/36 |
| 2,604,961 | 7/1952 | Koch .................. 190/28 |
| 2,729,460 | 1/1956 | Forman .................. 280/40 |
| 2,741,349 | 4/1956 | Peters .................. 190/28 |
| 2,803,368 | 8/1957 | Koch .................. 190/28 X |
| 2,884,257 | 4/1959 | Menne .................. 280/40 |
| 2,920,802 | 1/1960 | Cook .................. 224/42.1 |
| 2,922,658 | 1/1960 | Manahan .................. 280/47.29 |
| 2,987,198 | 6/1961 | Crane .................. 214/10.5 |
| 3,007,710 | 11/1961 | Sykes .................. 280/42 |
| 3,088,623 | 5/1963 | Parker .................. 220/46 |
| 3,306,402 | 2/1967 | Heitler et al. .................. 190/49 |
| 3,391,765 | 7/1968 | Baker .................. 190/49 |
| 3,456,960 | 7/1969 | Rector .................. 280/47.29 |
| 3,565,305 | 2/1971 | Belokin, Jr. .................. 224/42.1 |
| 3,915,362 | 10/1975 | Hart .................. 224/42.1 |
| 4,175,769 | 11/1979 | Kazmark .................. 280/654 |
| 4,274,568 | 6/1981 | Bott .................. 224/319 |
| 4,460,189 | 7/1984 | Goff .................. 280/47.27 |

FOREIGN PATENT DOCUMENTS

2253024  7/1973  Fed. Rep. of Germany ........ 190/28

Primary Examiner—William Price
Attorney, Agent, or Firm—Gausewitz, Carr & Rothenberg

[57] ABSTRACT

This invention provides a carrying case made up of two sections of molded plastic which are identical except at their outer edges which meet when the case is closed. One edge includes a tongue with reinforcing ribs which enters a groove in the outer edge to engage a gasket and form a fluid seal as well as strengthening the case. Nothing penetrates the wall of the case, the latches being connected to supports spaced outwardly from the case wall. Sockets on the bottom of the case receive spaced support members projecting from a luggage cart, and can receive connecting elements to enable the cart to carry more than one case. The sockets also can receive wheel units so that a single case may be mounted on wheels, or a plurality of cases may be connected and supported on a set of wheels. The case includes integral feet on the bottom wall to support it, and bosses on the inner walls for connecting items to the interior of the case.

6 Claims, 12 Drawing Figures

METHOD AND MEANS FOR SEALING A CARRYING CASE

CROSS REFERENCE TO RELATED APPLICATION

This application is a division of application Ser. No. 828,769, filed Feb. 12, 1986, for Carrying Case and Cart.

BACKGROUND OF THE INVENTION

A wide variety of carrying cases have been devised for serving a multiplicity of purposes. Although some of these cases are satisfactory in many respects, certain shortcomings exist for various purposes. Normally, the case will not be sufficiently rugged to resist extremely adverse conditions and rough handling. Some cases attempt to provide a fluid seal to prevent the passage of water and even to make the interior airtight. However, with these cases normally it becomes necessary to provide seals around the various fasteners and the like that extend through the walls of the case for securing the latches, the feet of the case, and so forth, to the case. This adds to the complexity and expense of construction and provides a potential path for leakage at each opening through the case wall. Difficulty also may be encountered in providing an effective fluid seal at the mating face of the case, where the lid portion meets the body of the case. Adequate strength and rigidity may be lacking at that portion of the case.

Transporting the cases of the prior art also may present a problem when they are to be moved other than by hand carrying. It has become common to put wheels on the bottom of the case, but these are less than satisfactory, because, having a narrow thread, they permit the case to topple over quite easily. Luggage carts also may be used, but these require the case to be strapped to the cart, which is a matter of some inconvenience. Even then, the attachment of the case may not be secure so that it may fall off.

SUMMARY OF THE INVENTION

The present invention overcomes the difficulties of the prior art in providing an improved carrying case of great durability yet of simplified construction.

The carrying case of this invention is made up of two integral molded plastic sections which are identical, except for the location of the seal at the edges that come together. An effective fluid seal is created by a continuous flange on one section made rigid by a plurality of ribs, engaging a gasket in a continuous recess on the other mating face. The ribs also enter the recess and provide reinforcement to the joint where the two sections of the case meet.

There are no openings through the wall of the case through which fluid might leak. To this end, the latches are attached to supports which are spaced away from the case walls so that no fasteners penetrate the case. The feet are integral molded elements, again requiring no separate attachment to the case. The latch supports include projecting portions such that the latches are recessed so that they are protected. Inside the case there are provided integral bosses with blind holes to receive fastening elements, providing a means for attaching items that must be carried so that they will not shift around within the case. On the outside provisions are made for attaching suction cups to permit the case to be mounted on a cartop. Again, the openings do not extend all the way through the wall of the case, instead extending into the thickened portions provided by the bosses. Slots are provided on the exterior of the case through which straps may extend for securing the case to the top of an automobile or other object.

For transporting the case there are provided transverse receptacles on the bottom wall which are adapted to receive projecting support members of a special hand truck-type luggage cart. The supporting elements include spring detents which snap onto the edge of the transverse wall of the receptacle to hold the supporting element in place so that the case will not slide off. While the supports of the luggage cart may engage the case from one side, extensions may be inserted into the receptacles on the other side of the case to be received in the receptacles on a second case, permitting the luggage cart to carry more than one case at a time. Both cases will be secure in this manner. The luggage cart is constructed so that the supporting elements can be folded inwardly and upwardly, so that the luggage cart becomes compact for storage.

DETAILED DESCRIPTION OF THE INVENTION

The carrying case 10 of this invention is made up of two principal sections 11 and 12, each of which is of molded plastic construction. It is preferred to use a strong, durable plastic, such as the polyester polycarbonate alloy resin marketed by General Electric under the trademark "Xenoy 5220U". The sections 11 and 12 are identical, with the exception of the seal along their mating faces, as explained below. Accordingly, each of the sections 11 and 12 defines a container of generally rectangular shape, but with rounded corners, which is half of the receptacle that the case provides. The section 11, therefore, includes a top wall 14, bottom wall 15 and opposed end walls 16 and 17. Similarly, the section 12 has a top wall 19, bottom wall 20 and opposed end walls 21 and 22. The top, end and bottom walls of the section 11 are connected by a larger outer wall 23, which forms the sidewall of the case. A similar wall 24 connects the edges of the top, bottom and end walls of the section 12. The bottom walls 15 and 20 are provided with hinge socket portions 25, 26 and 27 which fit together and receive hinge pins. The result is three hinges which connect the two sections 11 and 12 of the case.

The only distinction between the two sections 11 and 12 is at the mating edges of these two sections. The section 12 includes a recess 28, which is rectangular in cross-sectional configuration, and extends inwardly from the flat outer face 29 of an enlarged bead 30 that extends around the walls 19, 20, 21 and 22 at their outer edges. As a result, the bead 30 is U-shaped in cross section. The recess 28 is continuous and offset so that it provides an outer wall 31 which is thicker than the inner wall 32 opposite from it. The inner wall 32 of the recess 28 is flush with the walls 14, 15, 16, 17 and 23 of the case section 11. Received within the recess 28 at its inner end, and spaced from the outer surface 29 of the bead 30, is a gasket 33 of elastomeric material.

Figure 3:
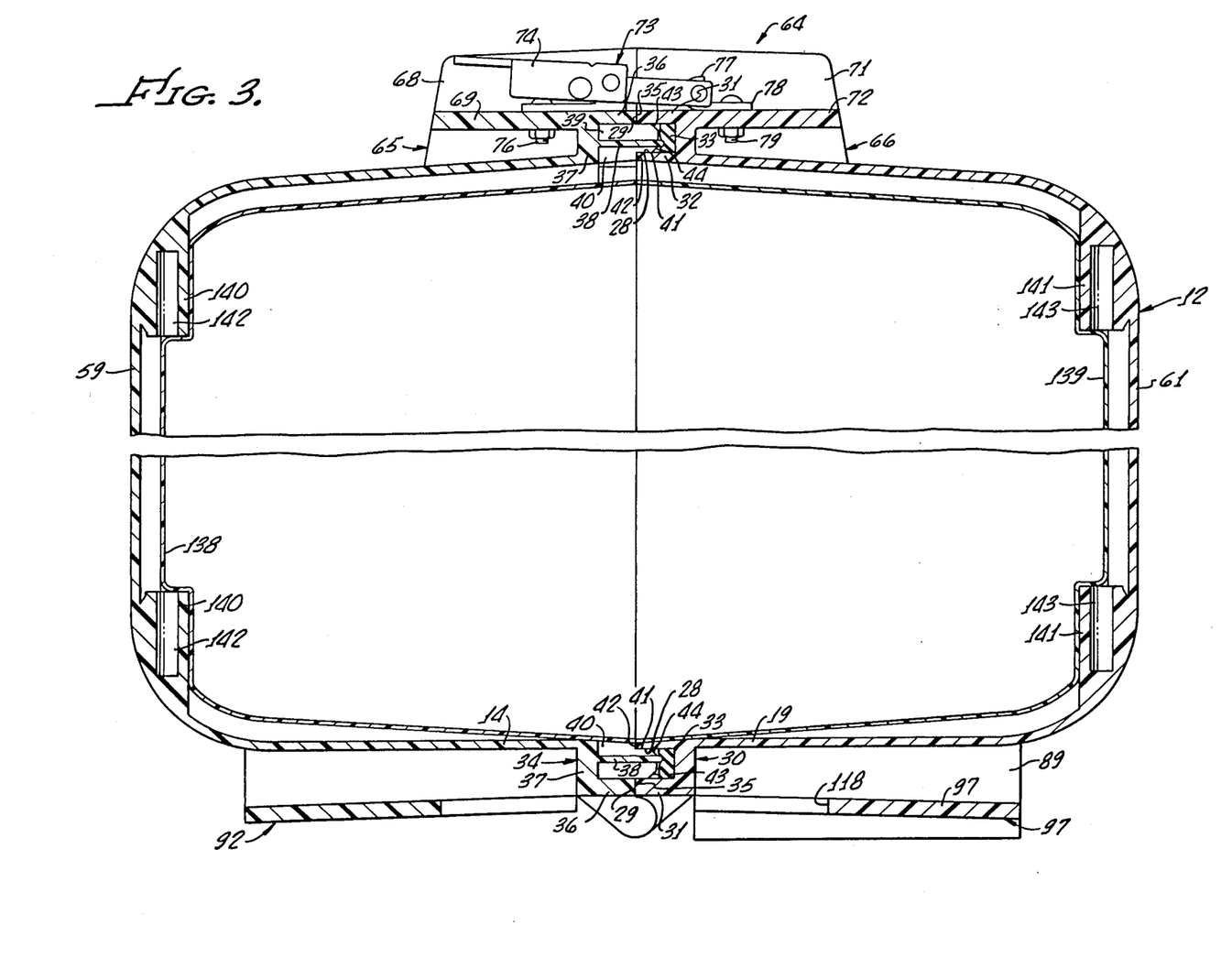
FIG. 3 is an enlarged transverse sectional view taken along line 3—3 of FIG. 1.

The other section 11 of the case also has an enlarged continous bead 34, which is similar in size to the bead 30, but which is L-shaped in cross section. The flat outer face 35 of one leg 36 of the bead 34 lies next to the outer face 29 of the bead 30 when the case is in the closed position, as illustrated in FIG. 3. Projecting from the central portion of the other leg 37 of the bead 34 is a flange or tongue 38 that extends longitudinally all the way around the bead 34. Spaced reinforcing ribs 39 and 40 are integral with the flange 38 and project perpendicularly from it. These ribs stop short of the outer edge of the flange 38. The outer ribs 39 connect to both the legs 36 and 37 of the bead 34. The inner ribs 40 join the leg 37 at the bases of the ribs. Notches 41 extend longitudinally from the outer edges of the inner ribs 40 for part of the lengths of these ribs, terminating in flat inner edges 42 which are perpendicular to the flange 38. The outer longitudinal edges of the two ribs 39 and 40 are parallel. At their outer corners 43 and 44, the ribs 39 and 40 are beveled to facilitate entry of these ribs into the recess 28.

When the case is in the closed position, the flange 38, which is considerably narrower than the recess 28, enters the recess, and its outer edge bears against the gasket 33. This provides an effective air-tight and water-tight seal.

In addition, the outer longitudinal edges of the ribs 39 and 40 lie next to the opposed sidewalls 31 and 32 of the recess 28. The inner sidewall 32 enters the notches 41 of the inner ribs 40 with its outer edge overlying the transverse inner edges 42 of the notches. The ribs, therefore, can bear against the sidewalls 31 and 32 of the recess 28, preventing lateral movement between the two case sections at their mating edges. This significantly increases the strength of the seam between the two sections 11 and 12 of the case. The effect of the interengagement of the ribs 39 and 40 with the walls 31 and 32 of the case is to impart rigidity to the joint where the case sections 11 and 12 connect. Forces on the sides of the case would tend to spread the mating edges of the case apart were it not for this construction. Thus, the joint construction not only provides an effective seal, but also has the function of enhancing the strength of the case structure.

In preserving the integrity of the seal, the case is constructed so that nothing penetrates the wall of either the section 11 or 12. The handle 45 of the case, therefore, is integral with the walls of the unit, rather than being separately attached, as in conventional cases. In providing the handle 45, the sections 11 and 12 have central recessed portions 46 and 47 in their top walls 14 and 19, respectively. Extending across the outer parts of the recesses are straight handle elements 48 and 49 which are rounded on one side and flat on the other. When the case is closed, the two flat sides of the handle elements 48 and 49 are brought together, and, collectively, these two elements define a comfortably-gripped handle 45. The recesses 46 and 47 provide clearance for the fingers when the handle is gripped.

Figure 1:
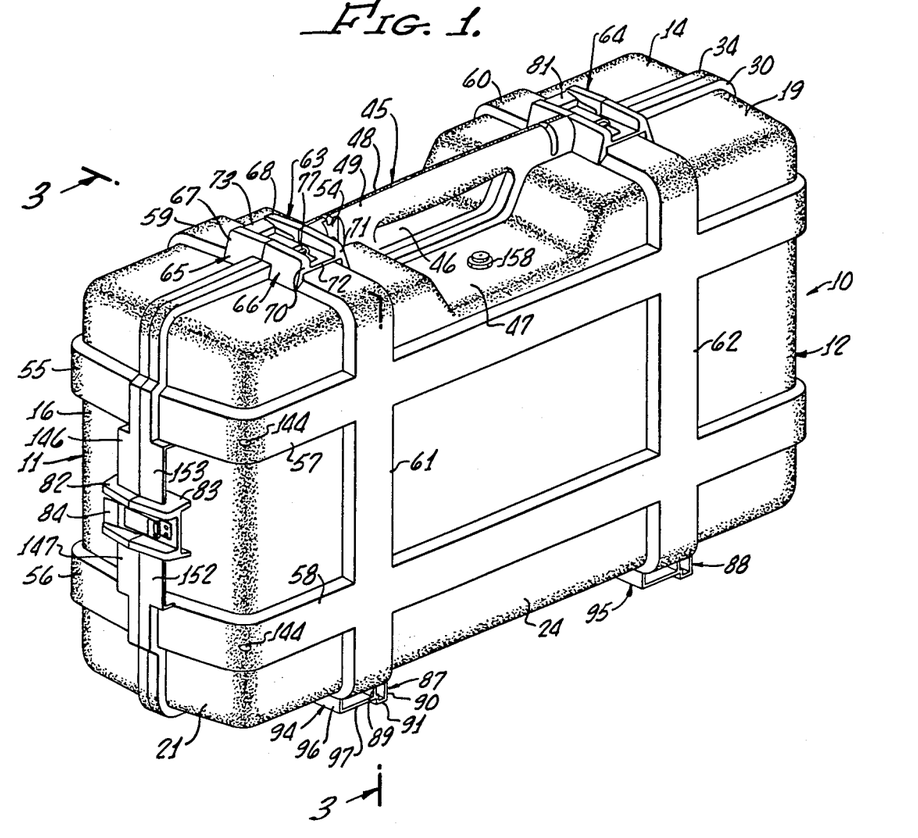
FIG. 1 is a perspective view of the carrying case of this invention in the closed positon.
Figures 2, 7:
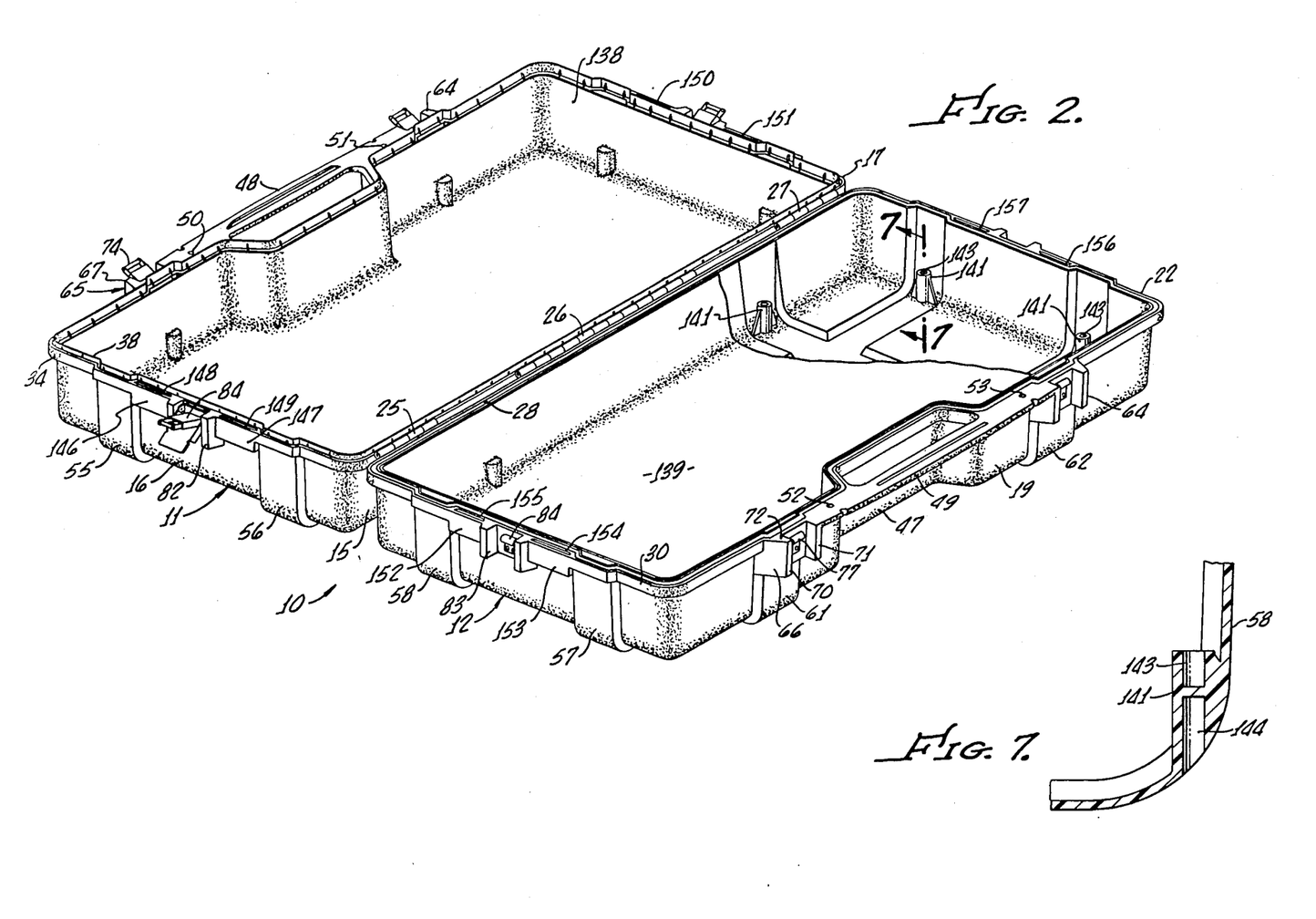
FIG. 2 is a perspective view of the case in the open position.
FIG. 7 is an enlarged fragmentary sectional view taken along line 7—7 of FIG. 2.

At the outer extremities of the handle element 48, beyond the recess 46, there are provided small cylindrical openings 50 and 51 that are spaced outwardly from the wall 14 (see FIG. 2). Corresponding openings 52 and 53 are located at the ends of the handle section 49, spaced outwardly from the wall 19. When the case is closed, the openings 50 and 52 are in registry, as are the opening 51 and 53. These openings are for receiving the hasps of padlocks (not shown) which prevent the opening of the case. A recess 54 around the opening 52, as seen in FIG. 1, will receive a portion of the body of the padlock. A similar recess (not shown) is provided around the outer surface of the opening 51 for receiving the body of a padlock extending in the opposite direction. As a result, the padlock will be recessed below the outer parts of the handle 45.

The walls of the two sections 11 and 12 of the case are distended outwardly to provide two spaced ribs that extend longitudinally around the case and two additional spaced ribs that extend transversely around the case. This includes longitudinal rib portions 55 and 56 on the section 11 and corresponding ribs 57 and 58 on the section 12. In the closed position of the case, the ribs 55 and 56 meet at their ends, as do the ribs 57 and 58, resulting in two spaced continuous longitudinal ribs.

In a similar manner, the case includes transverse ribs 59 and 60 on the walls 14, 15 and 23 of the section 11, and similar ribs 61 and 62 on the walls 19, 20 and 24 of the section 12. The ribs 59 and 61 meet to provide one of the continuous transverse ribs, and the ribs 60 and 62 provide the other. These ribs enhance the rigidity of the two sections 11 and 12 of the case.

Extending above the ends of the mating ribs 59 and 61, and of the ribs 60 and 62 at the ends of the handle 45, are latch supports 63 and 64. The latch support 63 is made up of identical sections 65 and 66 on the two case sections 11 and 12. The latch support section 65 includes two opposed walls 67 and 68 that project outwardly from the wall 14 on either side of the rib 59. The walls 67 and 68 are connected by a flat wall 69 that is spaced inwardly from the outer edges of the walls 67 and 68 and also spaced away from the outer surface of the rib 59. The latch support section 66 is formed in a similar manner, including opposed walls 70 and 71, and an interconnecting wall 72 spaced inwardly from the outer edges of the walls 70 and 71 and spaced above the rib 61. The two sections of a latch 73 are secured to the two latch support sections 65 and 66. The latch 73 includes an over-center locking element 74 mounted on a plate 75 which is held by a fastener 76 to the wall 69 of the support section 65 (FIG. 3). On the support section 66 is a hook 77 that extends from one end of a plate 78 which is connected by a fastener 79 to the wall 72.

As a result of this construction, the fasteners 76 and 79 that are used in holding the sections of the latch 73 to the case extend only through the walls 69 and 72 of the latch supports, and not through either of the walls 14 and 19 of the case sections 11 and 12. Thus, the latch results in no danger of leakage of fluid into the case, because the case is not penetrated for holding the latch 73. Moreover, by being mounted on the walls 69 and 72, the latch components are recessed below the outer edges of the opposed walls of the latch support 63, thereby protecting the latch.

The latch support 64 is identical to the latch support 63, carrying a latch 81 in the same way that the latch 73 is carried.

Additional latches are provided at the two ends of the case. Only the latch at one end, that is, at the walls 16 and 21, is illustrated in detail, the other being identical at the opposite end of the case. Latch supports 82 and 83 extend outwardly from the central portions of the end walls 16 and 21 of the case sections 11 and 12, respectively, and mount the two sections of a latch 84. The latch supports 82 and 83 are similar to the latch supports 63 and 64, having opposed walls interconnected by walls that are spaced below the outer edges of the ribs, as well as being spaced outwardly from the end walls 16 and 21 of the case. This allows the components of the latch 84 to be attached to the two latch supports 82 and 83 without penetration of the wall of the case. Again, the latch is recessed and protected.

The feet to support the case are integral with the bottom walls 15 and 20, and do not involve the attachment of separate pads. To this end the wall 15 includes two spaced integral, rectangular, hollow projections 85 and 86 that extend transversely across the wall. Similar projections 87 and 88 extend transversely across the other bottom wall 20. The foot 87, for example, includes opposed sidewalls 89 and 90 connected at their outer edges by a transverse wall 91. The other feet have the same construction. These projections provide support for the case when it is set downwardly in the normal vertical position of FIG. 1.

The case is adapted for connection to a hand truck-type luggage cart and so is provided with receptacles which receive the spaced support members of the hand truck, as will be explained below. There are two spaced receptacles, or sockets, 92 and 93 on the wall 15 and another pair of spaced receptacles, or sockets, 94 and 95 on the other bottom wall 20. Each of these receptacles is generally U-shaped in cross section, extending outwardly from one of the transverse ribs and positioned adjacent one of the feet of the case. As an example, the receptacle 94 includes parallel sidewalls, one of which is the wall 89 that also is one sidewall of the foot 87. The other sidewall 96 is located on the opposite side of the transverse rib 61 of the case. A flat wall 97 connects the outer edge of the wall 96 to the wall 89 and is spaced from the outer surface of the rib 61 of the case section 12. The receptacle 94 is shorter than the foot 87, with the wall 89 extending beyond the transverse wall 97 so that the wall 97 is recessed inwardly of the outer wall 91 of the foot 87. Therefore, the case does not sit on the receptacle 94.

The transverse wall 97 is at a shallow angle relative to the outer surface of the rib 61. As a result, the receptacle 94 defines a wedge-shaped opening that tapers in cross section from its entrance adjacent the side of the case to its inner end adjacent the bead 30.

The other receptacles 92, 93 and 95 are identical to the receptacle 94.

Figures 4, 6:
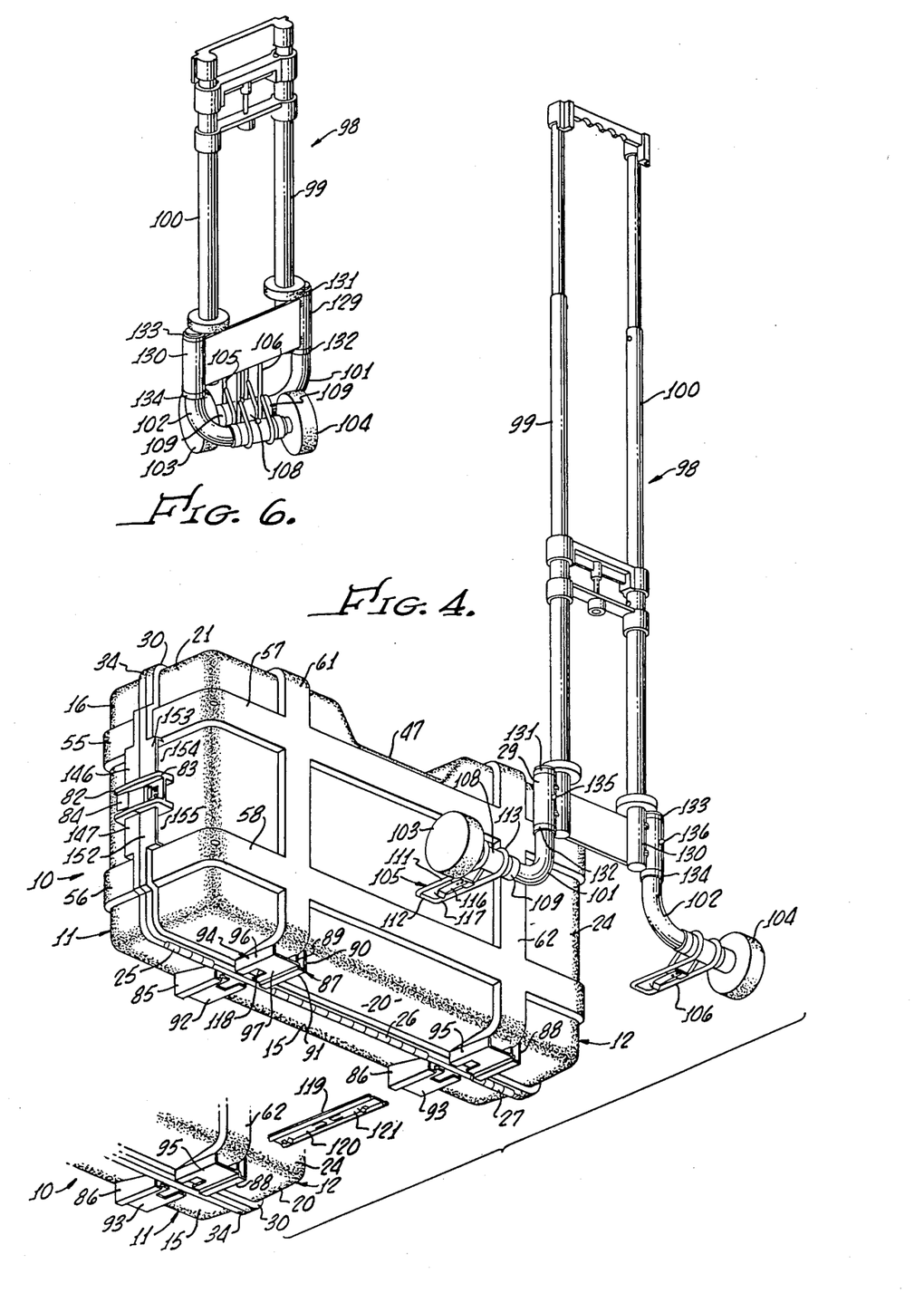
FIG. 4 is an exploded perspective view illustrating the luggage cart and the case.
FIG. 6 is a perspective view of the luggage cart in the folded position.
Figure 5:
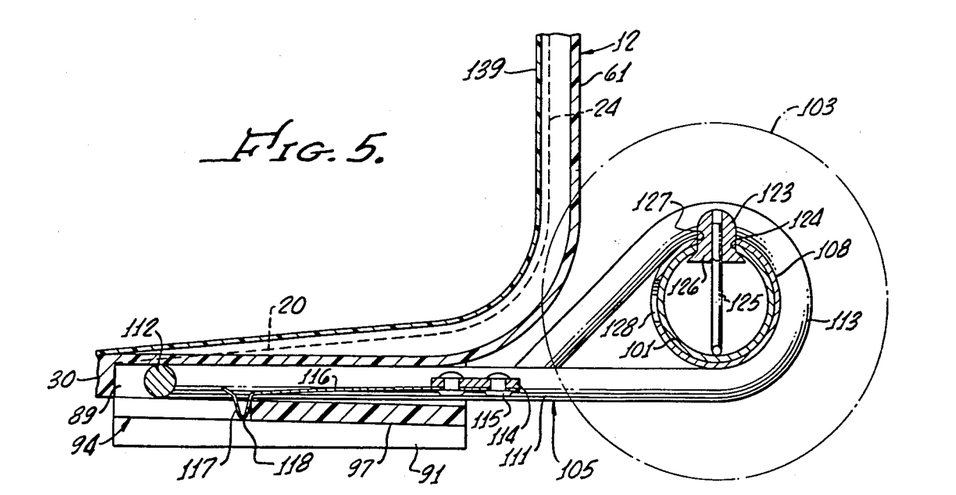
FIG. 5 is an enlarged fragmentary transverse sectional view illustrating the manner in which the support element of the luggage cart engages the receptacle of the case.

The case 10 can be transported by a cart 98, as shown in FIGS. 4 and 5, which has an upstanding portion that includes spaced parallel posts 99 and 100, at the lower ends of which are laterally outwardly extending L-shaped arms 101 and 102, respectively. Wheels 103 and 104 are at the outer ends of the arms 101 and 102. Carried by the horizontal portions of the arms 101 and 102, and projecting forwardly, are parallel support members 105 and 106. The member 105, which appears in enlarged detail in FIG. 5, includes a sleeve 108 that extends around the arm 101 between two collars 109 that are welded to the arm 102 at either end of the sleeve 108. This allows the sleeve 108 to rotate relative to the arm 102 while holding it against axial movement. In use, the sleeve is locked against rotation, as explained below. A bifurcated rod 111 has parallel elements which project forwardly from the arm 101 and are provided with an interconnecting portion 112 at their outer ends. The opposite ends 113 of these parallel elements are looped around and welded to the sleeve 108. A transverse bracket 114 extends between the parallel elements of the bifurcated rod 111. Attached to the bracket 114, such as by rivets 115, is a leaf spring 116 which has a V-shaped outer end 117.

The support member 106 is identical to the member 105.

When the cart 98 is in use, the supports 105 and 106 fit in the receptacles on one side of the case 10, such as the receptacles 94 and 95 in the example given. When fully inserted, the end of the leaf spring of the support fits within a recess at the end of the bottom wall of the receptacle. Thus, the end 117 of the spring 116 fits within a rectangular recess 118 in the wall 97 of the receptacle 94. This provides a detent effect as the end 117 of the spring engages the shoulder formed by the inner edge of the recess 118. This retains the case 10 to the cart 98 so that the case will not slide off of the supports 105 and 106.

Two of the cases 10 may be carried at once by the cart 98 through the use of connector strips 119 shown in FIG. 4. These are strips of metal, having longitudinal ribs for reinforcement, dimensioned to fit in the receptacles 92, 93, 94 and 95. Leaf springs 120 and 121 are riveted to the strip 119 at its central portion, projecting in opposite directions. Each of the springs 120 and 121 is similar to the spring 116, having a V-shaped outer end. Accordingly, the connector strip 119 may fit in any of the receptacles 92, 93, 94 or 95 of one case, where it is held by one of the leaf springs, and also fit within the receptacle of the second case to be held by the other leaf spring. In the example of FIG. 5, a connector strip 119 is shown positioned to enter the receptacle 93 of the case 10 that is fully illustrated. It will also to fit within the receptacle 95 of a second case 10, partially shown. A similar connector strip 119 will connect to the receptacle 92 of one case 10 and to the receptacle 94 in the other case. This holds the second case to the first, so that the luggage cart 98 can transport both.

The cart 98 can be collapsed for compact storage. The upstanding posts 99 and 100 telescope in a conventional manner to the shorter dimension shown in FIG. 6. In addition, the supports 105 and 106 can be pivoted upwardly, and the arms 101 and 102 rotated inwardly, so that the overall dimension of the cart 98 is minimized.

The sleeves of the supports 105 and 106 are rotatable relative to the arms 101 and 102, which enable the supports to be pivoted to the raised position of FIG. 6 for storage. The supports are locked in their extended position when in use by detents that extend through matching openings in the arms and the sleeves. Thus, as seen in FIG. 5 for the arm 101, there is a dome-shaped detent 123 which is pressed outwardly through an opening 124 in the arm 101 by means of a wire spring 125. A flange 126 at the bottom of the detent 123 is wider than the opening 124 and keeps the detent 123 from escaping from the arm 101. When the support 105 is in the locked extended position, the detent 123 also extends through an opening 127 in the sleeve 108. This prevents rotation of the sleeve 108 relative to the arm 101, and hence precludes rotation of the support 105. However, the detent 123 may be pressed inwardly manually, so that it is out of the opening 127 which then permits rotation of the sleeve 108, and hence the support 105, relative to the arm 101. An additional opening 128 in the sleeve 108 allows the detent 123 to lock the support 105 in a raised position.

Of course, the arm 102 is equipped similarly with a detent to releasably hold the support 106 in its extended position.

A similar arrangement permits the folding of the arms 101 and 102 to the position of FIG. 6. To this end, the posts 99 and 100 carry sleeves 129 and 130 which are welded to the outsides of the bottom ends of the posts. The vertical portions of the arms 101 and 102 fit within the sleeves 129 and 130. Collars 131 and 132 on the arm 101 prevent it from moving axially relative to the sleeve 129, and similar collars 133 and 134 prevent movement of the arm 102 axially relative to the sleeve 130. The sleeves 129 and 130 have openings through their walls through which can project spring-loaded detents 135 and 136, which are similar to the detent 123 illustrated in FIG. 5. When extended through the openings in the sleeves 129 and 130, the detents 135 and 136 hold the arms 101 and 102 in their extended positions, as shown in FIG. 4. However, the detents 135 and 136 may be pressed inwardly, permitting the arms 101 and 102 to rotate relative to the sleeves 129 and 130 so that the arms can be folded as shown in FIG. 6.

Interiorly, the case is provided with a liner 138 in the section 11 and a similar liner 139 in the other section 12. Beneath the liner, adjacent the walls of the sections 11 and 12, are bosses 140 in the section 11 and bosses 141 in the section 12 which are provided with blind openings 142 and 143, respectively. These bosses are integral with the case sections. They are located where the walls of the case are deflected outwardly for the ribs 55, 56, 57, 58, 59, 60, 61 and 62, so that the bosses are close to the walls of the case. There are eight of these bosses in each case section. The purpose of the bosses is to provide a means for mounting objects within the case. A fastener, such as a self-tapping screw, can be extended down into the blind opening in the boss to hold the object in the case. This may be desirable, for example, for carrying various display items or where the case is to carry equipment that must be securely anchored against movement within the case. It is necessary, of course, to penetrate the liners 138 and 139 when making an attachment to the boss beneath the liner, but this is readily accomplished.

Exteriorly of the case at its ends, generally at the junctures between the side and end walls, are additional blind openings 144 which are located opposite from the bosses 140 and 141 in the case sections 11 and 12. This locates the openings 144 so that they extend inwardly from the ribs 55 and 56 in the case section 11, and from the ribs 57 and 58 in the case section 12. As seen in FIG. 7, the openings 144 do not meet the openings 140 and 141, so that there are no apertures through the wall of the case. The openings 144 are to permit the mounting of suction cups on the exterior of the case, as desired, so that the case may be carried on the top of an automobile in a way that it is stable laterally and such that it will not mar the finish of the automobile.

Additionally, for cartop mounting or for other circumstances where it may be desired to extend straps around the case, there are provided guide openings which are adapted to receive straps and retain them against slippage off the case. To this end, the section 11 includes raised portions 146 and 147 on either side of the latch 84 on the end wall 16 through which extend narrow elongated slots 148 and 149 that are adapted to receive straps. Similar slots 150 and 151 are found at the opposite end wall 17. The case section 12 has raised portions 152 and 153 with slots 154 and 155 adjacent the upper edge of the end wall 21. A similar construction provides slots 156 and 157 at the opposite end. The slots 154 and 155 register with slots 148 and 149 when the case is in the closed position, so as to define continuous strap openings. Similarly, the slots 156 and 157 provided on the end wall 22 coincide with the slots 150 and 151 of the end wall 17 to provide the strap openings at the opposite end of the case.

Inasmuch as the case provides an effective fluid seal when closed, a manually operable relief valve 158 is provided in the recessed portion 47 of the upper wall 19 of the case section 12. When opened, the valve 158 allows air to flow between the exterior and interior of the case, which may be important, for example, where the case is closed at an altitude higher than where it is to be opened. Otherwise, atmospheric pressure would make it difficult to open the case.

As an alternative to the use of the cart 98, wheels may be attached to the carrying case 10 or to two of the cases 10 held together, as illustrated in FIGS. 8, 9, 10, 11 and 12. The wheel unit 159 includes an elongated metal plate 160 having a recess 161 at one end into which extends the mounting post 162 of a caster wheel 163. A flange 164 depends from the plate 160 and extends around its periphery. At a location adjacent the wheel 163 the flange 164 is provided with two downwardly-projecting portions, one on either side, defining vertical shoulders 165. There is a slight taper to the bottom edge 166 of the flange 164, so that the flange becomes more narrow as it approaches the outer end 167 of the plate 160.

A locking means to hold the wheel unit 159 in position with the cart, as explained below, includes a thin rod 168 that extends along the underside of the plate 160 and has an outer end 169 that is bent at right angles to the remainder of the rod 168 inwardly of the end portion. A transverse metal strap 170 is attached to the undersurface of the plate 160 and recessed at its central portion to receive the rod 168, thereby holding the outer portion of the rod to the plate.

At its opposite end, the rod 168 extends through an opening 171 in the sidewall of the recessed portion 161 and then extends outwardly to form a crank arm 172. This arrangement holds the other end of the rod 168 to the plate 160 and permits rotation of the rod 168 by means of the crank arm 172.

When the wheel units 159 are to be attached to the case 10, the support plates 160 are extended into the receptacles 92, 93, 94 and 95. In order to do this, the crank arm 172 is rotated 90° from the position of FIG.

10, so as to bring the end portion 169 alongside the undersurface of the plate 160. Then the plate 160 can be introduced into the receptacle, such as the receptacle 94, illustrated in detail in FIG. 12. The plate is moved into the receptacle until the shoulders 165 of the flange 164 are brought to bear against the outer edge of the transverse wall 97 of the receptacle. The taper of the bottom edge 166 of the flange 164 matches the taper between the wall 97 of the receptacle and the outer surface of the rib 61 of the case so that the plate 160 wedges into position to be retained firmly. The crank arm 172 is rotated 90° after the plate 160 enters the receptacle, bringing the end 169 of the rod 168 over the shoulder formed by the inner edge of the recess 118. This provides a detent that locks the wheel unit 159 to the underside of the case.

When one case is to be moved on wheels, a unit 159 is attached to each of the receptacles 92, 93, 94 and 95. The case then is more stable than conventional wheeled cases by having a wider tread for the wheels. The support posts 162 for the wheels 163 are located outboard of the sides of the case and maximizing the space between the wheels. Also, this positions the crank arms 172 outwardly of the sides of the case and accessible from the top, which facilitates both attachment and removal of the wheel units 159.

Two cases may be attached together side-by-side and supported on four of the wheel units 159. The bottom portions of the cases 10 are attached together by connectors 173 that fit into the adjacent receptacles on the bottoms of the two cases being joined. The connector 173 includes an elongated plate 174 with side flanges 175 and 176. At their central portions the flanges 175 and 176 are wider so as to provide shoulders 177 and 178 facing toward one end 179 of the plate 174 and shoulders 180 and 181 facing toward the opposite end 182. The flanges 175 and 176 taper in width from the shoulders 177 and 178 to the end 179 and from the shoulders 180 and 181 to the end 182. This is a similar taper to that of the flange 164 of the unit 159, enabling the connector 173 to be wedged into the receptacles of the case for a firm connection.

Transverse metal straps 184 and 185 are welded to the underside of the plate 174 and recessed at their central portions for rotatably receiving a rod 186. The straps 184 and 185 are spaced inwardly a short distance from the ends 179 and 180, respectively, of the unit. The ends 187 and 188 of the rod 186, outwardly of the straps 184 and 185, are bent in the same direction at 90° relative to the rod inwardly of the straps. At the center, the rod 186 includes a loop 189 bent transversely of the rod to provide a manual means for rotating the rod 186 relative to the plate 174. Preferably, there is a slight bow in the rod 186 between the central looped portion 189 and the straps 184 and 185 so that the rod 186 will bear against the undersurface of the plate 174 when rotated away from the position of FIG. 11, where the end portions 187 and 188 project downwardly. This is the locked position of the connector 173, and the light spring force thus provided tends to maintain the locked position. This same arrangement may be provided for the rod 167 of the wheel unit 159.

Figure 8:
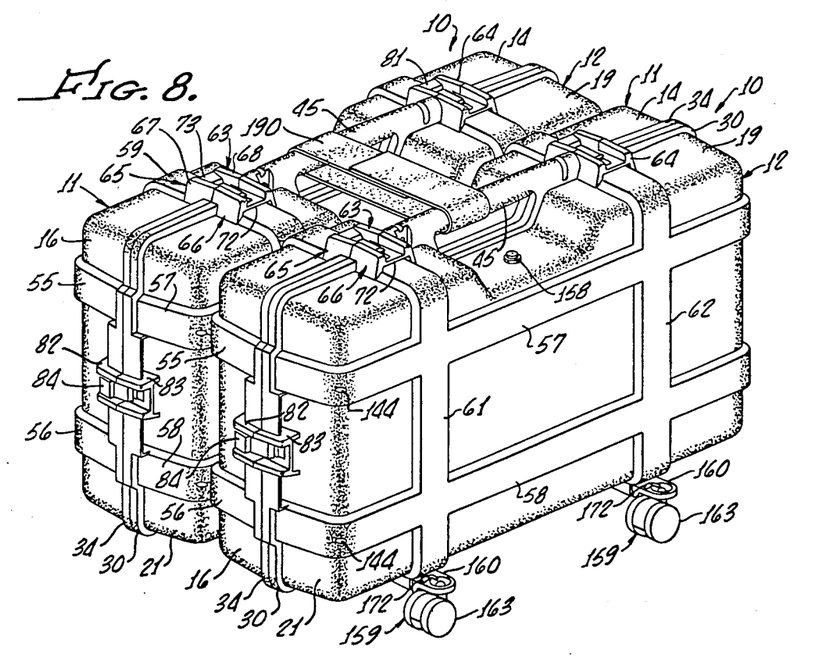
FIG. 8 is a perspective view of two of the cases secured together and provided with wheels.
Figure 9:
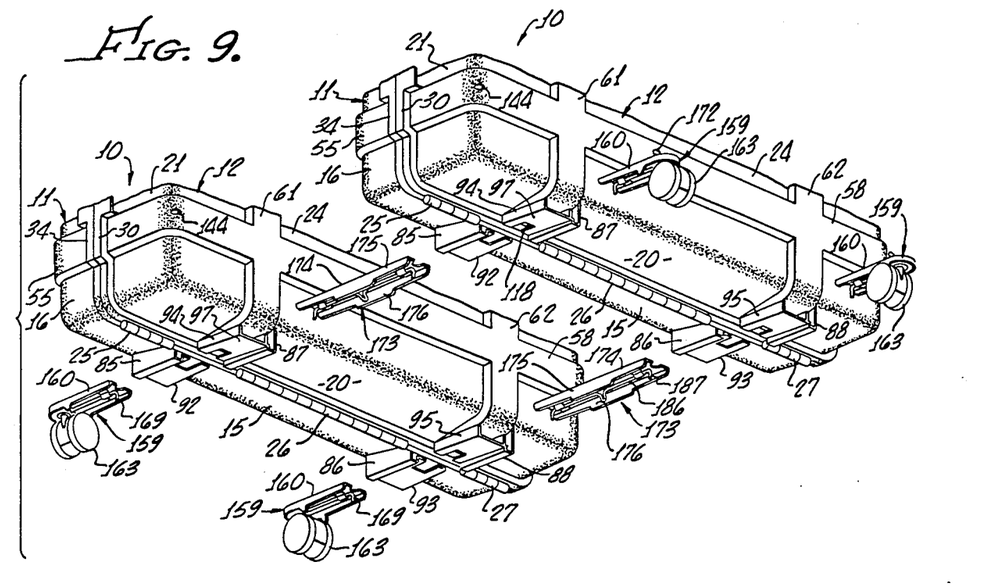
FIG. 9 is a fragmentary exploded perspective view of the under portions of the two cases illustrating the components for connecting the cases and attaching the wheels.
Figures 10, 11:
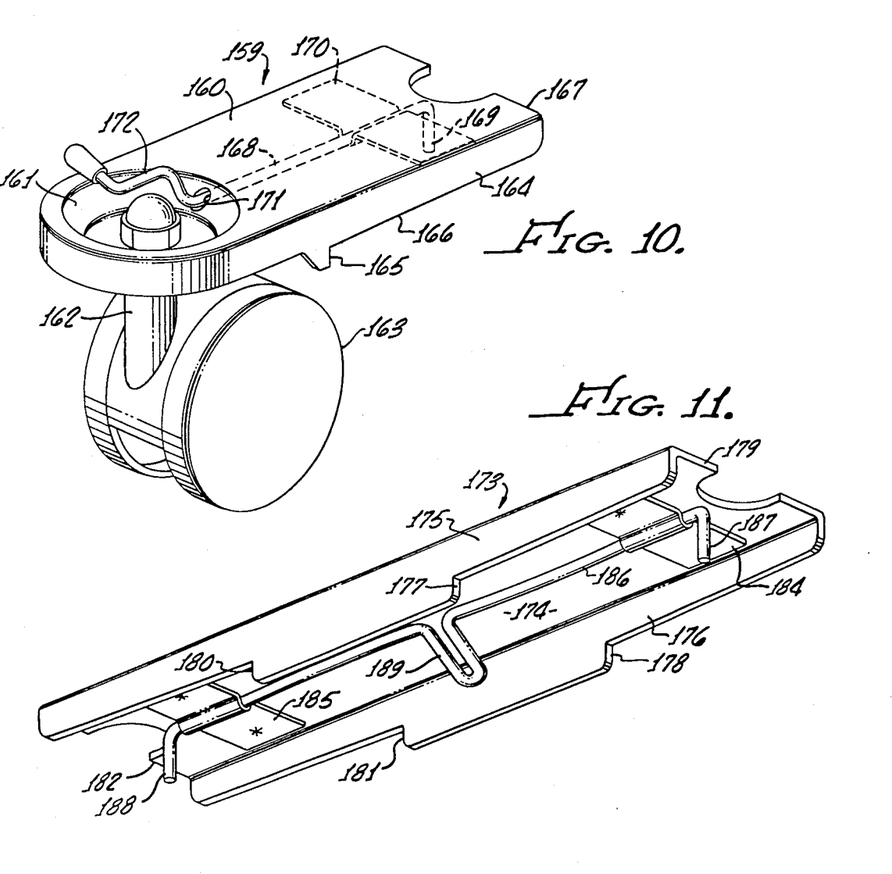
FIG. 10 is an enlarged perspective view of one of the wheel units.
FIG. 11 is an enlarged perspective view of one of the connecting members.
Figure 12:
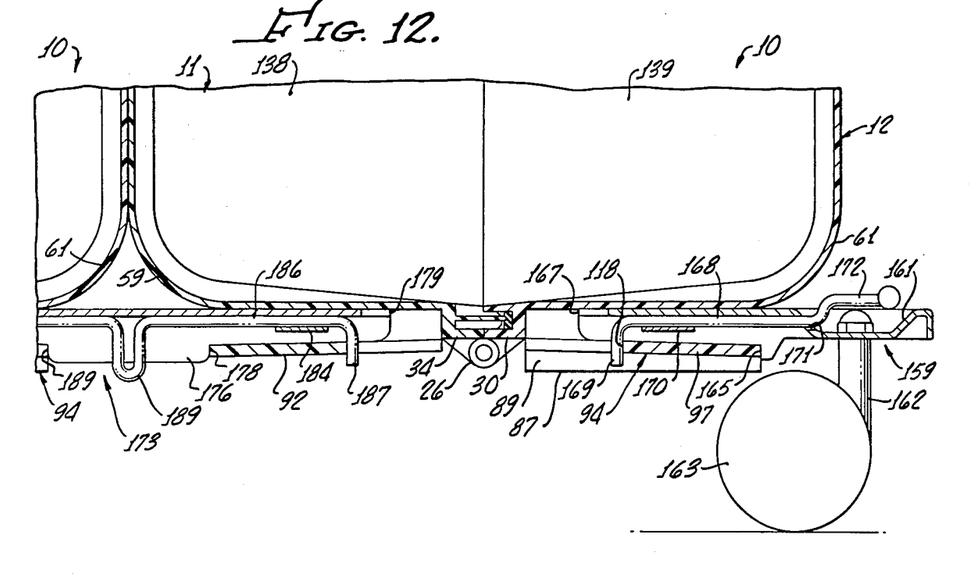
FIG. 12 is an enlarged fragmentary transverse sectional view illustrating the attachment of the wheel units and the connecting members.

When two cases 10 are positioned side-by-side, as shown in FIG. 8, the sockets, or receptacles, on the undersurfaces of the two cases are in opposed pairs. A connector 173 is inserted into each pair of receptacles of the adjacent sides of the two cases, with the rod 186 first being rotated to cause the ends 187 and 188 to lie along the undersurface of the plate 174. When the connector 173 has been inserted all the way into the two receptacles, so that the shoulders 177 and 178 of the flange engage the end of the outer wall of one of the receptacles and the shoulders 180 and 181 engage the end of the outer wall of the other receptacle, the rod 186 is rotated 90° to the locked position. This brings the ends 187 and 188 past the shoulders at the recesses in the transverse walls of the receptacles. The bottom portions of the cases then are securely held together.

Preferably, for added stability, a strap 190, as shown in FIG. 8, is extended around the handles 45 of the two cases 10 to secure the upper portions together.

The wheel units 159 are connected to the outwardly-facing receptacles of the two connected cases, thereby providing four wheels around the outer periphery of the two cases. In the embodiment illustrated in FIG. 9, the wheel units 159 are joined to the receptacles 94 and 95 of the case 10, illustrated to the upper right. The other two wheel units 159 connect to the receptacles 92 and 93 of the case 10, illustrated at the lower left.

Although shown as connecting two cases 10, three cases and even more may be connected by the connectors 173, with the wheel units 159 then being positioned at the outer sides of the joined cases.

The foregoing detailed description is to be clearly understood as given by way of illustration and example only, the spirit and scope of this invention being limited solely by the appended claims.

What is claimed is:
1. A carrying case comprising
two sections, each having an outer edge portion
hinge means pivotally interconnecting said sections so that said sections can meet at said outer edge portions thereof, said sections having walls such that said sections define a closed container when said sections so meet at said outer edge portions,
one of said sections defining a recess around said outer edge portion thereof, said recess having sidewall means,
a gasket means within said recess,
the other of said sections including a continuous flange at said outer edge portion thereof, and a plurality of spaced ribs projecting laterally from said flange, said flange being narrower than said recess, said flange when said sections so meet at said outer edges being within said recess and engaging said gasket means for forming a seal therewith,
said ribs when said sections so meet extending to a position of juxtaposition with said sidewall means for reinforcing the joint between said sections.
2. A device as recited in claim 1 in which said ribs project from the opposite sides of said flange.
3. A device as recited in claim 2 in which said ribs are spaced inwardly from the outer edge of said flange, said flange engaging said gasket means at said outer edge portion thereof.
4. A device as recited in claim 3 in which said ribs have beveled corners at their outer edges for facilitating entry of said ribs into said recess.
5. A device as recited in claim 1 in which each of said sections is an integral molded plastic member, each of said sections including a portion distended outwardly to define at least one transverse rib, and a portion distended outwardly to define at least one longitudinal rib, said ribs of said two sections meeting at their ends to define ribs extending around said container.

6. The method of producing a sealed carrying case comprising the steps of providing two sections each of which has an outer edge, connecting said sections by a hinge such that said sections can meet at said outer edges thereof, providing said sections with walls such that said sections define a closed container when said sections so meet at said outer edges thereof, providing in one of said outer edges a recess having sidewall means defining a space therebetween, inserting a gasket into the inner portion of said recess, providing a continuous flange on the other of said outer edges such that said flange enters said recess and engages said gasket when said sections so meet at said outer edges thereof, said flange being made narrower than said space, and providing spaced rib means projecting laterally outwardly from said flange such that said rib means enter said recess along with said flange, said rib means being made to a dimension such that said rib means are in juxtaposition with said sidewall means when said rib means so enter said recess for reinforcing the joint between said sections.

* * * * *